July 6, 1965

U. M. STAEBLER 3,193,466

NEUTRONIC REACTOR OPERATION

Filed May 15, 1953

INVENTOR.
ULYSSES M. STAEBLER
BY
*Roland A. Anderson*
ATTORNEY

July 6, 1965 U. M. STAEBLER 3,193,466
NEUTRONIC REACTOR OPERATION
Filed May 15, 1953 4 Sheets-Sheet 2
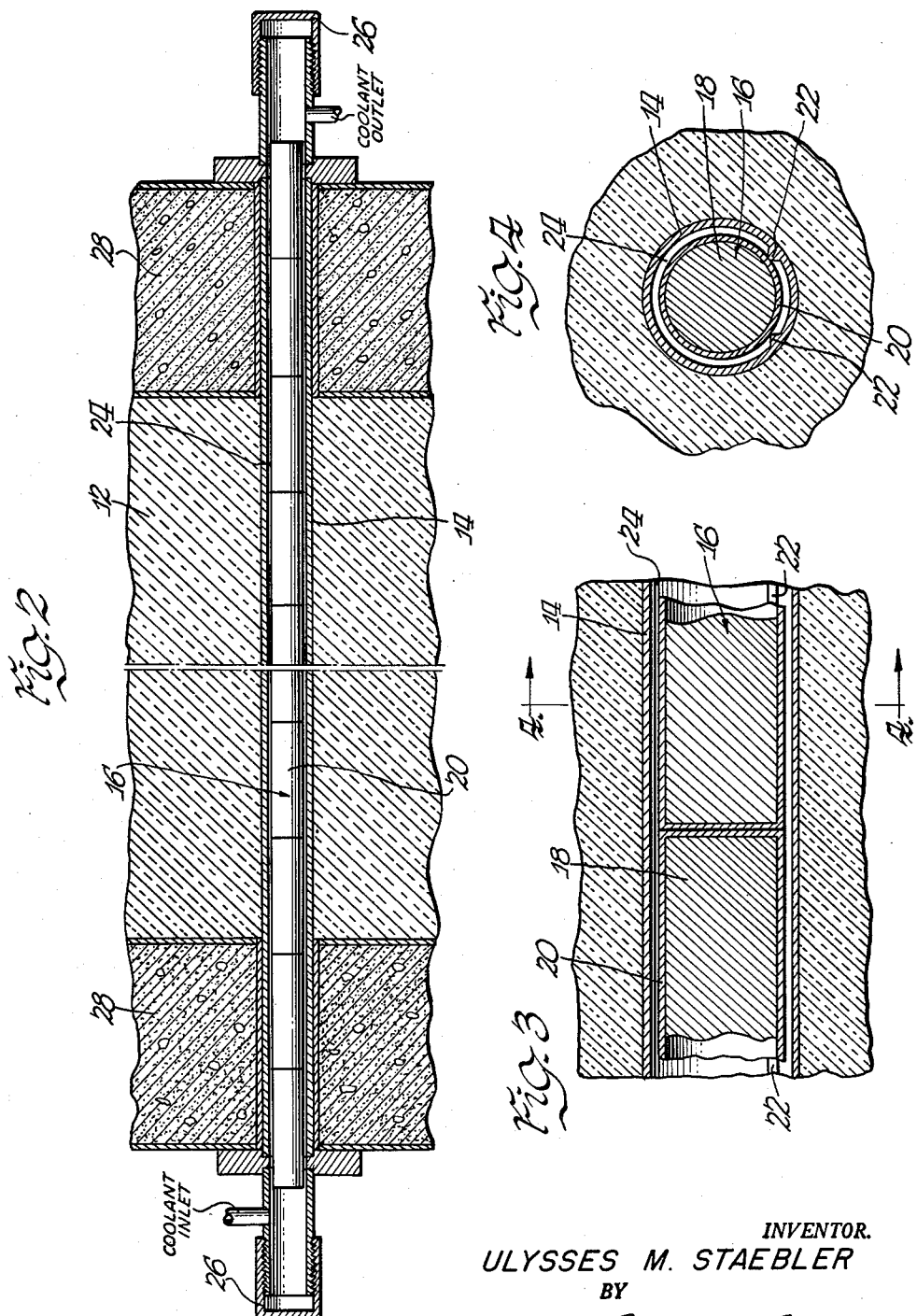
INVENTOR.
ULYSSES M. STAEBLER
BY
Roland A. Anderson
ATTORNEY

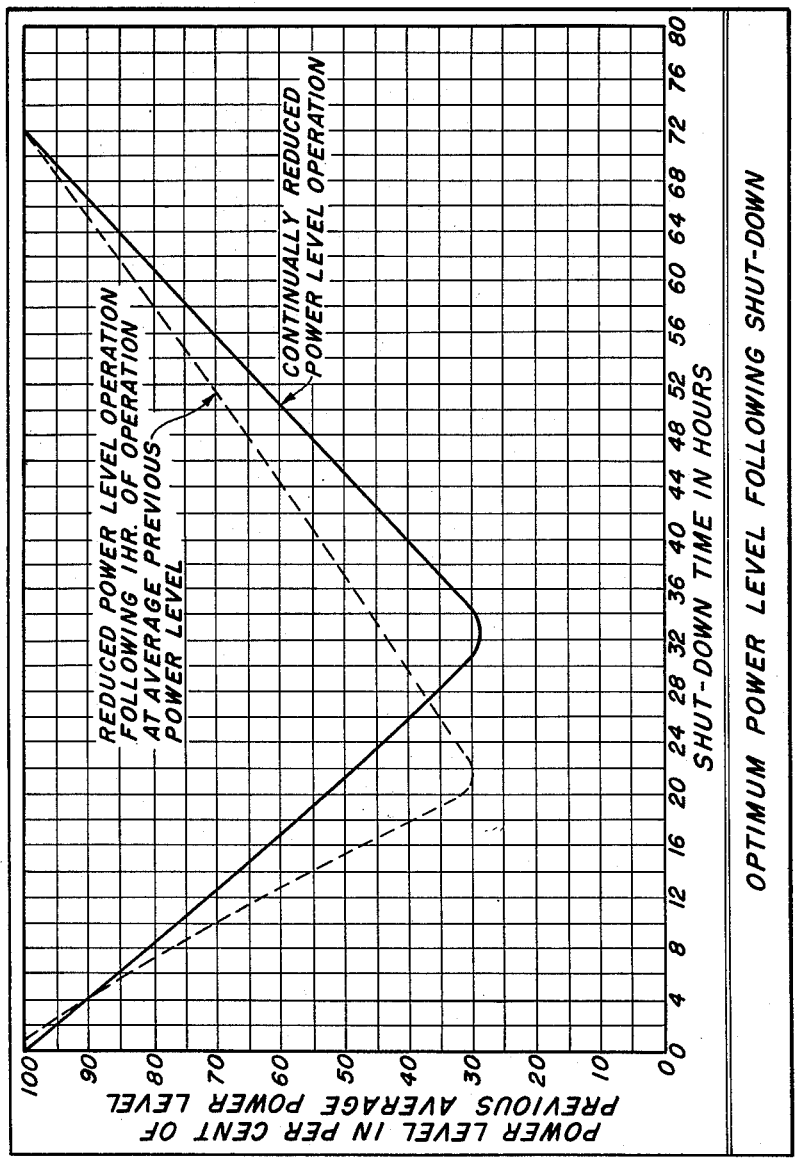

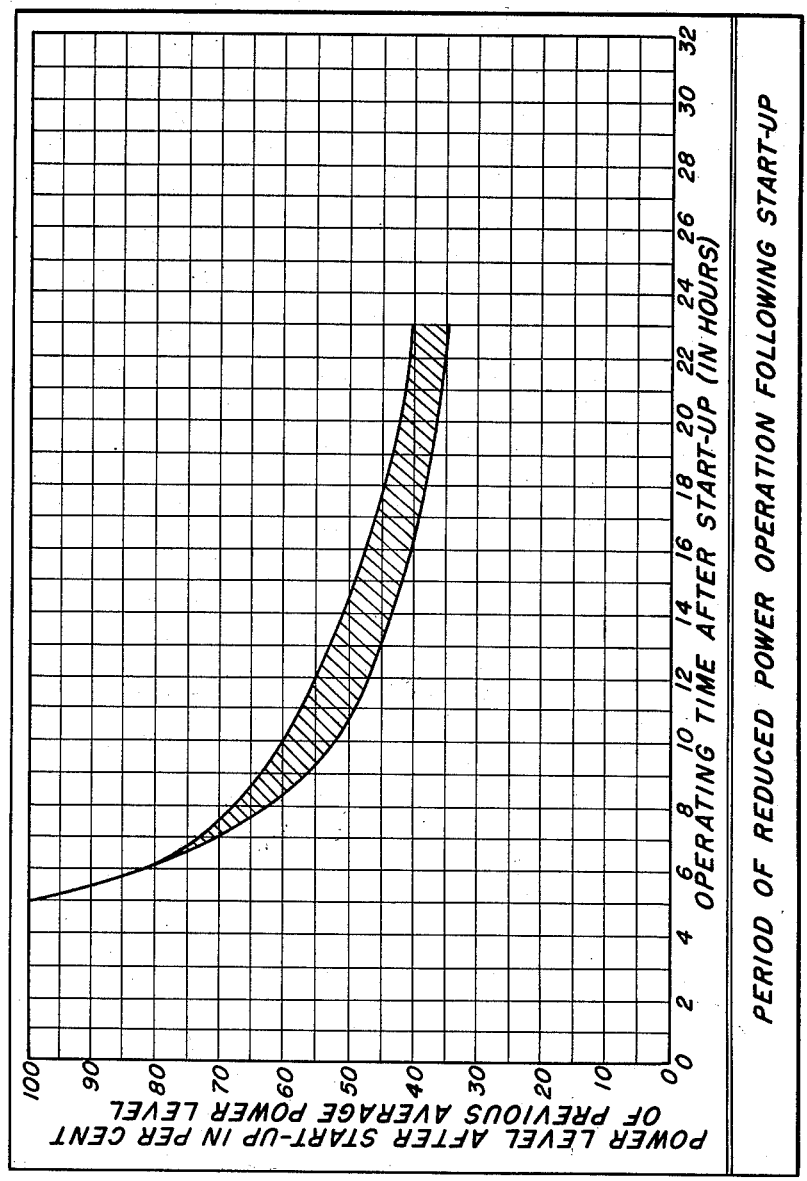

United States Patent Office 3,193,466
Patented July 6, 1965

3,193,466
NEUTRONIC REACTOR OPERATION
Ulysses M. Staebler, Silver Spring, Md., assignor to the United States of America as represented by the United States Atomic Energy Commission
Filed May 15, 1953, Ser. No. 355,279
1 Claim. (Cl. 176—20)

The present invention relates to methods of operating neutronic reactors, and more specifically to methods of resuming operation of a neutronic reactor after a period of shutdown.

After a neutronic reactor has been completed, but before it has been operated for the first time, there are no fission fragments present within the reactor structure to alter the neutron multiplication factor, i.e. the ratio of the number of neutrons in one generation to the number of neutrons in the preceding generation within the active portion of a reactor of infinite size. Also under these conditions the temperature of the reactor is that of the ambient atmosphere.

The reactor may be started by increasing the neutron reproduction ratio of the reactor, i.e. the ratio of the number of neutrons in one generation to the number of neutrons in the preceding generation for the neutronic reactor as it is actually constructed including the effect of the control elements actually positioned within the active portion of the reactor. The neutron reproduction ratio may be increased in several ways including removing neutron absorbing material from the active portion of the reactor, introducing larger quantities of fuel into the active portion of the reactor, and selecting the energy of the neutrons impinging on fissionable material within the active portion of the reactor. In order to initiate the neutronic chain reaction, the neutron reproduction ratio must at least equal unity, and the extent to which the neutron reproduction exceeds unity will determine the period of the reactor; or in other words, the time required for the reactor to increase its neutron flux by a factor of $e$, or 2.718.

As the neutronic chain reaction develops, certain reactor transients occur which affect the neutron reproduction ratio of the reactor. In the first place, power is liberated by the process of neutronic fission and heats the active portion of the reactor. The increased temperature of the reactor fuel material usually has a deleterious effect upon the neutron reproduction ratio of the reactor, while the increased temperature of some of the moderator materials, such as graphite, improves the neutron reproduction ratio of the reactor. Thus, a reactor may have either a positive or a negative power coefficient, i.e. reactivity change with power change, depending upon the particular structure.

Secondly, operation of the neutronic reactor also results in the formation of fission products, and the fission products produced will in general change the neutron reproduction ratio, since they will not have the same neutron capture cross sections as the fissionable material consumed by the reaction. One of the most important changes in the neutron reproduction ratio of a neutronic reactor results from the formation of $Xe^{135}$ through the process of fissioning $U^{235}$. One of the fission products from $U^{235}$ is $Te^{135}$ which initiates the following chain:

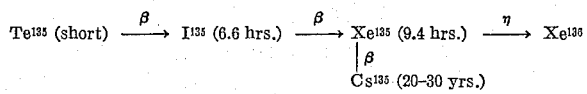

The figures in the parentheses indicate the half lives of the elements, the letter $\beta$ indicating a transformation by the emission of an electron and the letter $\eta$ indicating a transformation by the capture of a neutron. Even though $Xe^{135}$ does not exist in a neutronic reactor in large quantities, it has a large adverse effect on reactivity, since it has a neutron capture cross section of approximately $3.2 \times 10^6$ barns. In the presence of a neutron flux, the concentration of $Xe^{135}$ within a reactor may be determined at any given time T by the equation $$N_{Xe} = \frac{\lambda_I}{\lambda_I \lambda_{Xe}} \int_0^t CP(\tau)[e^{-\lambda_{Xe}(t-\tau)} - e^{-\lambda_I(t-\tau)}]d\tau$$

where $\lambda_I$ is the iodine decay constant and equals 0.1050 per hour, $\lambda_{Xe}$ is the xenon decay constant and equals 0.0737 per hour, $P(\tau)$ is the power level of the reactor in kilowatts, and C is a proportionality constant for the reactor. The production of $Xe^{135}$ in the active portion of a reactor depends upon the amount of $I^{135}$ present in the reactor which in turn is a function of the number of fissions occurring in the reactor and proportional to the neutron flux.

Also, the destruction of $Xe^{135}$ occurs in two ways. First, the $Xe^{135}$ decays to cesium 135, and second, the $Xe^{135}$ may capture a neutron to become $Xe^{136}$. In either case, the reactivity of the reactor is increased, since both of these isotopes have very much smaller neutron capture cross sections than $Xe^{135}$. Because $Xe^{135}$ has a half-life of approximately 9.4 hours, approximately 99 percent of the xenon present in a neutronic reactor will decay within a period of 72 hours in the absence of a neutron flux.

When the neutron flux density within the reactor has been maintained at a relatively constant level over a rather long period of time, the concentration of $Xe^{135}$ will reach a relatively fixed value. As set forth in the equation above, this value is a function of the power level of the neutronic reactor, because it depends upon the neutron flux for a substantial fraction of the destruction of $Xe^{135}$, and upon the rate of fissions for the production of iodine 135. For these reasons, neutronic reactors operating at large power levels produce substantial quantities of $Xe^{135}$ and require much greater excess reactivity, i.e. the excess of the neutron multiplication factor above unity, to overcome the neutron absorption in the $Xe^{135}$ than do reactors operating at relatively low power levels.

When a neutronic reactor is shut down, the destruction of $Xe^{135}$ by the capture of neutrons ceases, since a substantial neutron flux no longer exists in the active portion of the reactor. The total destruction of $Xe^{135}$ is then due solely to radioactive decay. However, the production of $Xe^{135}$ is not immediately altered by shutting down the neutronic reactor, since the supply of $I^{135}$ is not immediately reduced. For this reason, the $I^{135}$ continues to decay to $Xe^{135}$ which builds up to a greater concentration than is possible when the neutronic reactor is operating at a constant power level. If the neutronic reactor remains inoperative, the $Xe^{135}$ reaches a peak concentration and then decays, so that approximately 99 percent of the $Xe^{135}$ has decayed within 72 hours. However, if it is desired to start the reactor during the peak concentration of $Xe^{135}$, it will be necessary to have sufficient excess reactivity to overcome the added neutron loss. For this reason, some neutronic reactors which have been constructed may only be restarted in a relatively short time following shutdown, or after the lapse of a sufficient period of time for the $Xe^{135}$ peak to decay.

If the neutronic reactor has sufficient excess reactivity to become chain reacting during the period of peak $Xe^{135}$ concentration, the $Xe^{135}$ present in the reactor is quickly destroyed by absorption of neutrons and transformation to $Xe^{136}$. The $Xe^{136}$ has a thermal neutron absorption cross section of approximately 0.15 barn, and hence has an effect upon the neutronic chain reaction many orders of magnitude less than that of its parent, $Xe^{135}$. Also, at the moment the neutronic chain reaction is re-initiated, the reactor contains relatively small quantities of $I^{135}$, the $I^{135}$ having decayed to $Xe^{135}$. As a result, the production of $Xe^{135}$ is small. Hence, the neutron reproduction ratio of the reactor is increased to a value approaching the neutron reproduction ratio of the reactor before it had ever been operated.

The reactivity surge of a reactor following start-up after a prolonged period of shutdown creates a problem in control of the reactor. Many reactors are operated with safety controls and regulating controls, and it may be necessary in restarting a neutronic reactor of this type to employ more control than the regulating control elements provide. For this reason, many reactors have been operated with columns of neutron poison materials, such as boron or cadmium, inserted in the active portion of the reactor to overcome the excess reactivity resulting following start-up. However, when equilibrium conditions between the $I^{135}$ and $Xe^{135}$ have been re-established under a constant power level of operation, it is necessary to remove the poison columns from the reactor. This necessitates a shutdown of the reactor which may require a period of time in the neighborhood of 6 hours, since it is necessary to wait for the decay of radioactivity before the poison columns may be removed from the reactor.

It is an object of this invention to provide a method of operating a neutronic reactor which will minimize the reactivity surge following start-up after a period of shutdown, and hence avoid the control complications in so far as possible.

It is also an object of the present invention to increase the productivity of a neutronic reactor by eliminating the period of shutdown following start-up after a period of inoperation which is required to remove poison columns from the reactor.

Other objects and advantages of the present invention will be readily understood by the man skilled in the art from a further reading of the present specification.

In order to more fully understand the present invention, an example of its application on an illustrative reactor will be helpful. A suitable reactor for this purpose is shown in the figures, in which:

FIGURE 2 is a fragmentary sectional view of one of the process tubes of the reactor shown in FIGURE 1;

FIGURE 3 is an enlarged fragmentary sectional view of a portion of the tube shown in FIGURE 2;

FIGURE 4 is a sectional view taken along line 4—4 of FIGURE 3;

Figure 1:
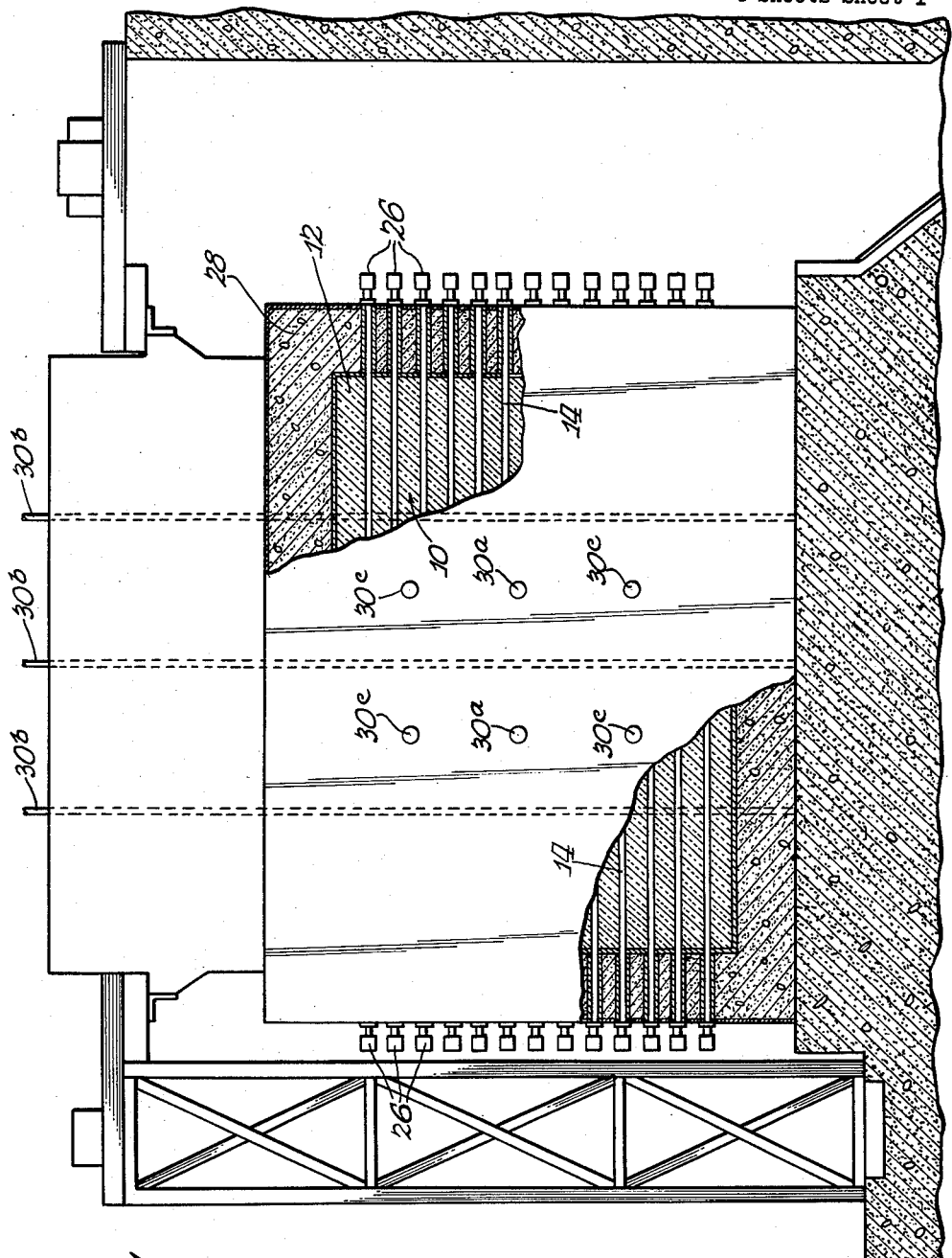
FIGURE 1 is a front elevational view partly cut away and in section of such a reactor.

FIGURE 5 is a graph showing the relation between shutdown time in hours and the percent of the average previous power level which produces the minimum reactivity peak after start-up and also this relationship when the reactor has been operated following shutdown at the average previous power level for a period of one hour before reducing the power level; and FIGURE 6 is a graph showing the relation between the percent of the average previous power level following shutdown to the period of required reduced power operation to avoid reactivity peaks exceeding the first reactivity peak following start-up.

The reactor shown in FIGURES 1 through 4 may be used to illustrate operation of a neutronic reactor according to the present invention. The reactor has an active portion 10 including a moderator 12 which is pierced with a plurality of tubes 14 containing fuel elements 16. The active portion of a reactor may be defined as the region within the reactor containing the fissionable material. Each of the fuel elements 16 has a body 18 of material fissionable by neutrons of thermal energy and a jacket 20 of neutron permeable material of suitable structural characteristics with small neutron capture cross section. The fuel elements 16 rest on ribs 22 within the tubes 14 forming an annulus 24 between the fuel elements 16 and the tubes 14. A flow of coolant water is provided through the annuli 24 for cooling the fuel elements 16.

As shown in FIGURE 2, the ends of the coolant tubes 14 are provided with caps 26 which may be removed for the insertion of fuel elements 16, the one end of each coolant tube 14 being connected to a source of coolant under pressure and the other end being connected to a coolant exhaust system.

A radiation shield 28 surrounds the active portion 10 of the reactor and prevents the escape of harmful radiations from the active portion 10 of the reactor. A plurality of control elements 30 traverse the shield 28 and are slidably disposed within the active portion 10 of the reactor. A more detailed description of such a reactor as here described is contained in the copending application of Enrico Fermi and Leo Szilard, entitled "Chain Reactions," Serial No. 568,904, filed December 19, 1944, now Patent No. 2,708,656, issued May 17, 1955.

For operational convenience, the control elements 30 are generally operated as three different and distinct systems, the control elements 30 having been designated 30a, 30b, and 30c for this reason. The system represented by the control elements 30a may be termed the regulating rods, which are controls used to effect small changes in the reactivity of the reactor. The control elements 30b are safety rods and are used for safety purposes only, generally being maintained in a withdrawn position from the active portion 10 of the reactor during operation. These safety rods 30b are actuated only for purposes of shutting down the neutronic chain reaction or to "poison" the reaction in response to excessive high neutron flux densities within the reactor. The third control system, 30c, called "shim control rods" is used to effect step changes in the reactivity of the neutronic reactor. In the particular construction shown in FIGURES 1 through 4, the shim control rods and regulating rods are horizontal, and the safety rods vertical. Further details of a suitable control system for a neutronic reactor such as that here described appear in the copending patent application of Volney C. Wilson, Louis Slotin, Wilcox P. Overbeck, and Darol K. Froman entitled "Control System," filed April 14, 1945, Serial No. 588,302, now Patent No. 2,816,860, issued December 17, 1957.

When a neutronic reactor is to be operated for the first time, the maximum neutron reproduction ratio of the reactor is large due to the fact that there is at this time essentially no $Xe^{135}$ present in the reactor. As a result, some neutronic reactors are designed to operate with regulating controls and shim controls, such as those designated 30a and 30c in the present illustration, which are incapable of controlling the initial reaction. In order to properly operate such reactors, columns of "poison" are introduced into the active portion of the reactor in order to aid in the control of the reaction while the concentration of $Xe^{135}$ is building up in the reactor. However, when the neutronic chain reaction has stabilized, i.e. attained a relatively constant operating temperature and power level as well as a constant concentration of $I^{135}$ and $Xe^{135}$, the poison columns may be removed from the reactor and the regulating and shim control systems used to maintain the reactivity of the reactor at a relatively constant level. Should changes in power be desired, the shim control system is used to establish a desired period of multiplication or decay for the neutronic chain reaction. The safety control system is generally not useable to control the reactor when in operation, since automatic actuating devices require this system to be fully inserted as a unit, and not piecemeal.

Neglecting changes in the reactivity of the reactor resulting from temperature changes or barometric pressure changes, the maximum reactivity which may be achieved after a start-up following a prolonged period of shutdown will be greater than the stabilized value but less than the optimum reactivity of the reactor following its construction. However, if the reactor has been operated for a substantial period of time, the amount of excess reactivity which may be absorbed in the control elements of the reactor may also have decreased, since the absorption of neutrons in the control elements transforms the materials of the control elements to other elements which in general have smaller neutron capture cross sections. As a result of these considerations, care must be exercised to avoid too great a reactivity peak upon resuming operation following shutdown of the reactor.

The inventor has found that the magnitude of the reactivity peak following shutdown may be minimized by resuming operations at a reduced power level according to the curves set forth in FIGURE 5.

As an example, a neutronic reactor operated at a previous average power level of 250 megawatts which before shutdown had an excess reactivity of 50 inhours will have peak excess reactivities as expressed in the following table for shutdowns of 26 hours, 28 hours, and 30 hours, if started up at the indicated power levels and maintained at these levels.

TABLE 1

| Percent Previous Average Power Level | Excess Reactivity (inhours) | | |
|---|---|---|---|
| | Shutdown time, 26 hrs. | Shutdown time, 28 hrs. | Shutdown time, 30 hrs. |
| 20 | 325 | 333 | 344 |
| 30 | 313 | 324 | 337 |
| 40 | 310 | 324 | 339 |
| 50 | 312 | 327 | 343 |
| 60 | 315 | 332 | 349 |
| 70 | 321 | 338 | 355 |
| 80 | 328 | 344 | 361 |
| 90 | 336 | 351 | 367 |
| 100 | 345 | 357 | 372 |

It is thus to be noted that a twenty-six hour shutdown will produce a minimum reactivity peak of approximately 310 inhours after start-up at a constant power level of 100 megawatts, or 40% of the previous average power level. This value compares with minimum peak reactivities of 323 inhours for a shutdown of 28 hours and 337 inhours for a shutdown of 30 hours, but these values are obtained at power levels of 35% and 30% of the average previous power levels, respectively. FIGURE 5 also illustrates these values.

The peak reactivity following shutdown referred to above is an initial peak reactivity. After the power level of a reactor has been increased from its reduced value to a higher stabilized value, there will be a second peak reactivity. Further, the second reactivity peak may exceed the first reactivity peak. However, if the reduced power level is maintained sufficiently long, the second reactivity peak will be smaller than the first reactivity peak because the formation of $I^{135}$ will be sufficient to supply adequate quantities of $Xe^{135}$ to prevent the second reactivity peak from becoming excessive.

Again, the period of time at which the reactor must be operated at a reduced power level in order to assure the second reactivity peak being smaller than the initial reactivity peak following shutdown is a function of the power of the reactor before shutdown and the duration of the period of shutdown. The graph shown in FIGURE 6 sets forth the period of reduced power operation following shutdown which must be maintained in order to avoid an excessive second reactivity peak.

The inventor has also found that the initial excess reactivity peak may be further reduced in magnitude by resuming operation following shutdown at the average previous power level prior to shutdown for a period less than 2 hours, then followed by operation at reduced power level. The effect of operating the reactor following shutdown at the average previous power level is to shift the curve of minimum reactivity peaks by producing larger quantities of $I^{135}$ immediately following start-up while there are still substantial quantities of $Xe^{135}$ in the reactor. As a result, the minimum excess reactivity peak may be reduced in magnitude for a given reduced power level, as illustrated in the following table, the data being taken under the same conditions as that of Table 1, but with one hour of operation at the average previous power level before operation at reduced power.

TABLE 2

| Percent Previous Average Power Level | Excess Reactivity (inhours) | | |
|---|---|---|---|
| | Shutdown time, 26 hrs. | Shutdown time, 28 hrs. | Shutdown time, 30 hrs. |
| 20 | 307 | 327 | 348 |
| 30 | 298 | 312 | 339 |
| 40 | 298 | 315 | 335 |
| 50 | 303 | 320 | 337 |
| 60 | 311 | 327 | 341 |
| 70 | 320 | 335 | 348 |
| 80 | 330 | 343 | 356 |
| 90 | 338 | 351 | 364 |
| 100 | 345 | 357 | 372 |

From Table 2 it is apparent that there is an optimum percentage of the average previous power level at which a reactor has been operated prior to shutdown for each shutdown period, assuming the reactor to be operated at the previous average power level for one hour prior to reducing power. These optimum power levels are shown by the dotted line in FIGURE 5. FIGURE 5 also illustrates that this method of operation requires reducing the power of the reactor to a greater extent than merely commencing operation at a reduced power level if the period of shutdown is less than 28 hours, but operation at the previous average power level for one hour following start-up after a shutdown period exceeding 28 hours permits operation of the reactor at a higher power level than merely resuming operation at a reduced power level while still producing a minimum reactivity peak.

In general, the power level of a reactor will be maintained at a constant maximum level, even following shutdown, in order to utilize the production capabilities of the reactor to the utmost unless it is necessary to reduce the reactivity peak following shutdown because of inadequate control facilities to cope with the reactivity peak. Hence, the optimum power level following shutdown to produce a minimum reactivity peak will not generally be used, since reactor controls will permit a somewhat larger reactivity peak. In this case, there is a reduction in the reactivity peak by initially operating the reactor at the previous average power level for a period less than two hours, even for shutdowns of 28 hours duration and less, because somewhat greater reductions in the reactivity peak following shutdown are achieved by this method of operation where the optimum power level is exceeded following start-up.

The inventor has also found that operation of the reactor at the previous average power level for a period exceeding two hours and then reducing the power level of the reactor will produce a larger reactivity peak following shutdown than is produced by operating the reactor at a continuous reduced power level following shutdown. The optimum time for operating the reactor at the average previous power level to produce a minimum reactivity peak is approximately one hour depending upon the particular reactor, but not more than two hours.

FIGURE 6 is a graph showing the period of time which a reactor must be operated at reduced power following shutdown in relation to the percent of previous average power level at which the reactor is being operated. If the reactor is operated at reduced power for a lesser period of time than set forth by the curve in FIGURE 6, a second reactivity surge will exceed the first reactivity peak. It will be noted that the curve in FIGURE 6 is actually a family of curves, the shaded area being used to indicate this fact. If the reactor has been operated at the average previous power level for a period not exceeding two hours before reducing the power level, a somewhat shorter period of reduced power level operation is necessary to avoid an excessive second reactivity surge, providing the power level of the reactor exceeds approximately 50 percent of the previous average power level. Also, the duration of the period of shutdown affects the duration of the period of reduced power, the shorter shutdown periods requiring longer periods of reduced power for any given percentage of the previous average power level. For these reasons, the relation shown in FIGURE 6 cannot be shown as a single line. The following tables also illustrate this point.

TABLE 3

*Period of reduced power operation following shutdown required to retain the second reactivity peak to a value less than the initial reactivity peak*

| Percent Previous Average Power Level | Period Required in Hours | | |
|---|---|---|---|
| | Shutdown time, 26 hrs. | Shutdown time, 28 hrs. | Shutdown time, 30 hrs. |
| 40 | 23 | 18 | 16 |
| 50 | 14 | 12 | 10.6 |
| 60 | 9.6 | 9.0 | 8.2 |
| 70 | 7.4 | 7.2 | 6.8 |
| 80 | 6.1 | 6.0 | 6.0 |
| 90 | 5.4 | 5.4 | 5.4 |
| 100 | 5.0 | 5.0 | 5.0 |

TABLE 4

*Period of reduced power following operation at previous average power level for one hour following shutdown to retain the second reactivity peak below the first reactivity peak*

| Percent Previous Average Power Level | Period Required in Hours | | |
|---|---|---|---|
| | Shutdown time, 26 hrs. | Shutdown time, 28 hrs. | Shutdown time, 30 hrs. |
| 40 | 23 | 20 | 18 |
| 50 | 15 | 13 | 11.8 |
| 60 | 10.2 | 9.0 | 8.2 |
| 70 | 7.6 | 6.8 | 6.4 |
| 80 | 6.0 | 5.8 | 5.6 |
| 90 | 5.3 | 5.1 | 5.0 |
| 100 | 5.0 | 5.0 | 5.0 |

The foregoing description of the present invention sets forth the currently understood explanation for the improved performance resulting from the operation of a neutronic reactor as set forth. As the neutronic reactor science advances, it may be that additional reasons and considerations will be discovered for the improved performance of a reactor when operated according to the teachings of the present invention. It is intended that the scope of the present invention be not limited by the explanations here set forth, but only by the appended claim.

What is claimed is:

The method of resuming operation of a neutronic reactor that has been shut down after a period of operation at an average power level comprising reestablishing a neutronic chain reaction within the reactor within a period of approximately 72 hours, operating said reactor at a power level equal to the average previous power level for a period of time of approximately one hour, thereafter reducing the power of the reactor and operating said reactor at a power level set forth by the dotted line in Figure 5 for a period of time as given by the curve in Figure 6 and increasing the power level of the reactor up to the previous average power level.

References Cited by the Examiner

UNITED STATES PATENTS 2,708,656  5/55  Fermi et al. _____ 176—41

OTHER REFERENCES

The Elements of Nuclear Reactor Theory by Samuel Glasstone and Milton C. Edlund. D. Van Nostrand Co., New York 1952, pages 314–317, 329–339.

TID–7001, U.S. Atomic Energy Commission Materials Testing Reactor Project Handbook, edited by J. H. Breck, Carl F. Leyse, May 7, 1951, Technical Inf. Service, Oak Ridge, Tenn. Pages 268–272.

CARL D. QUARFORTH, *Primary Examiner.*

ROGER L. CAMPBELL, WILLIAM G. WILES,
*Examiners.*